Patented Oct. 5, 1943

2,330,836

UNITED STATES PATENT OFFICE 2,330,836

MAGNESIUM BASIC CARBONATE

Lewis B. Miller, Ambler, Pa., assignor to Keasbey & Mattison Company, Ambler, Pa., a corporation of Pennsylvania No Drawing. Application March 8, 1940,
Serial No. 322,975

4 Claims. (Cl. 106—121)

This invention relates to a magnesium basic carbonate of properties particularly suitable, for instance, in the manufacture of insulating material, such as 85% magnesia insulations.

The object of the invention is to provide a basic carbonate structure which will be strong and light, and at the same time show a low shrinkage on drying after molding.

Hitherto the attainment of strength and lightness has resulted in a composition which has large shrinkage on drying so requiring the final product to be molded oversize and milled to proper size for sale.

Examples of magnesium basic carbonate having strength and lightness but with high shrinkage factors are those characterized by a smooth "greasy" feel and showing a noncrystalline or gelatinous condition when examined by the X-ray method or under the petrographic microscope.

I have found that the non-crystalline gelatinous nature of such carbonates is associated with the large shrinkage factor and to attain low shrinkage with maintenance of strength and lightness, the particles making up the mass should embody crystalline formations and be definitely predetermined as to size, shape and composition. Such carbonate should superpose on the "greasy" or "lardy" feel an appreciable "sandiness" due to the presence of crystal agglomerates within a predetermined range of sizes, which while effective to reduce the shrinkage will make the final structure strong and of low density.

The smallest particles may be only a few microns in average diameter and the intermediates should progressively increase from the minimum to a maximum of 50 to 80 microns for the largest size particles. In a magnesium basic carbonate of desirable characteristics, the largest particles may, for instance, show an average diameter of 70 microns. Between the upper and lower limits there should be a gradual gradation of the intermediate sized particles.

In shape the particles should be of the roughly spherical or oblate spheriod type. The presence of elongated particles while not detrimental in small percentages does not contribute to the qualities desired in the basic carbonate and may seriously impair the strength whenever the great majority of the particles are not maintained of generally spherical form.

In composition a majority of the particles consist of exceedingly minute double refracting crystals immersed in a matrix of isotropic material. Only a relatively few, less than 20%, of these crystals are large enough to be separately discernible at 100 magnifications; and at the same magnification the double refracting crystals impart a soft glow to the particles being viewed under crossed Nicols. At 450 magnifications the individual doubly refracting crystals are readily discernible and may be photomicrographed. Under X-ray examination the crystalline material is sufficiently developed to yield a definite X-ray spectrum and may thus be differentiated both by X-ray methods and by petrographic methods from the noncrystalline type of magnesium basic carbonate.

When the particles of the present basic carbonate are permitted to settle freely after precipitation from the magnesium bicarbonate solution brought to or near the boiling point, the rate of reduction of volume occupied by the sediment is indicated in the following table. The rate of settling and volume of sediment are partially dependent upon the concentration of the magnesium bicarbonate solution and when a solution containing 1.5% to 1.6% of magnesium bicarbonate is boiled and 500 cc. of the hot suspension of magnesium basic carbonate is placed in a 500 cc. cylindrical graduate whose inside measurements, up to the zero mark, are approximately 1¾" in diameter and 11½" high, I have found that the successive volumes occupied by the sediment are approximately those set forth in the following example:

| Time of settling in minutes | Volume occupied by the sediment |
|---|---|
| | Cc. |
| 0 | 500 |
| 5 | 275 |
| 10 | 220 |
| 15 | 195 |

When magnesium basic carbonate, tested as indicated, departs radically from the settling rate and volume of sediment noted above, it has been found that the physical properties of the molded insulations also depart from those considered most desirable. The first five minutes reduction in volume should not exceed 250 cc., nor be less than 200 cc., and the following reductions will correspondingly follow the general shape of the curve as determined by the figures given above for the subsequent five minute intervals.

With magnesium basic carbonate of this invention mixed and molded with approximately 13% Canadian asbestos fiber, without the addition of any fillers or plastic, the density of the resulting block would be from 9.5 to 10.5 pounds per cubic foot; its modulus of rupture about 35; its linear shrinkage of the order of 1.7% and its volume shrinkage approximately 9.0%, thus combining high strength with low density and shrinkage. The shrinkage in each case is the size wet minus the size dry divided by the size wet. It also molds better and the draining of water from the material in the molds is more rapid. The new properties markedly increase the efficiency of the new product, and in particular maintain the other characteristics while lowering the losses due to shrinkage and warping. The shrinkage when high is usually irregular over the whole of the molded piece with resultant warping and distortion and reduction of a percentage of the molded pieces. In contrast with this the low and uniform shrinkage characteristics of the basic carbonate of this invention will in some cases permit the articles to be molded directly to size, thus avoiding all of the expenses and losses incident to the oversize molding and subsequent milling to size.

In the drying the linear and volume drying shrinkages are calculated as follows:

*Linear shrinkage*

$$\frac{(L_w - L_d)\,100}{L_w} = \text{per cent linear drying shrinkage}$$

Where $L_w$ is the length of the wet or freshly molded block before drying.

$L_d$ is the length of the dried block.

The linear shrinkage is based upon the length of the wet block as the reference.

Volume shrinkage is calculated as follows:

$$\frac{(V_w - V_d)\,100}{V_w} = \text{volume shrinkage in per cent}$$

Where $V_w$ is the volume of the block before drying.
$V_d$ is the volume after drying.

$$V_w = L_w \times W_w \times T_w$$

Where
$L_w$ = length before drying
$W_w$ = width before drying
$T_w$ = thickness before drying
and $$V_d = L_d \times W_d \times T_d$$

Where
$L_d$ = length after drying
$W_d$ = width after drying
$T_d$ = thickness after drying Because of the manner in which 85 percent magnesia is molded, the per cent shrinkage in all dimensions is not equal. The per cent shrinkage in length and in width upon drying is usually nearly the same. The per cent shrinkage in thickness, however, is always greater than the percent shrinkage in either length or width. Consequently, the linear shrinkage which is measured along the greatest dimension of the block appears proportionally smaller than would be expected from a consideration of the volume shrinkage.

No addition agents are used to modify or control the shrinkage or density in the product. Such addition agents will in many cases effect still further marked reductions in the shrinkages and densities noted above. The results presented above as characteristic of the material of this invention are attained purely through the control of the characteristics of the basic carbonate particles as above explained.

The magnesium basic carbonate of this invention may be prepared in various ways. Where it is being manufactured from magnesium bicarbonate liquor, I have found it desirable to use solutions whose strength exceeds 1.4% magnesium bicarbonate. It is possible to prepare the desired magnesium basic carbonate from solutions of lower strength but only under much more carefully controlled conditions.

I have also found it extremely desirable to control the flow of the magnesium bicarbonate solution to the boiling equipment so that there is a steady and uniform flow of solution. Boiling has been most easily effected by injecting steam under moderate pressures into the magnesia solution as the latter flows through the boiling equipment. The injection of steam must be adequately controlled so that temperatures in the boiling equipment may be kept within very narrow limits. In general, I have secured the best results when the magnesia bicarbonate is not raised throughout its full temperature range suddenly, but rather when the increase in temperature is accomplished more slowly. For instance, with a solution of magnesium bicarbonate 1.4%-2% by weight of dissolved magnesia calculated as magnesium bicarbonate, approximately saturated with carbon dioxide, the temperature is raised to 150°-160° F. in a preliminary boiler, and with this mass thoroughly mixed and even in temperature, it is passed on into a second heated boiler and raised to 200°-212° F., 205°-208° F. in this second boiler being preferred. These two precipitations will give the desired range of evenly distributed particle sizes in the final precipitate and with most of the particles showing the minute crystalline structure embedded in the isotropic matrix as above described.

While definite temperatures are given in the above description, I have found that the proper type of magnesium bicarbonate can be attained over a range of temperature by controlling other factors; thus lower final temperatures may be utilized by exerting a sub-atmospheric pressure within the boiling equipment. At substantially atmospheric pressures, I have found final temperatures in excess of 200° F. to be desirable, preferably temperatures differing from the boiling point of water by only a few degrees.

The utility of the new basic carbonate is not limited to its pure condition but it may be combined with other ingredients to form desired mixtures. For instance, in the magnesia industry, it is frequent practice to pulverize and reuse waste materials obtained when dried insulations are milled to size. This reused material is known as plastic and it is blended in with virgin materials in the proportion of 60% or so of the latter and 40% plastic, such a blend of virgin and plastic materials of the present invention when mixed with approximately 13% to 15% asbestos, having the following characteristics:

Density_____ About 14.0 lbs. per cubic foot
Modulus of rupture_____ 65
Linear shrinkage_____per cent__ 3.25
Volume shrinkage_____do____ 13.5

This represents a very advantageous combination of strength, lightness and low shrinkage in such a blended product and shows that the improved basic carbonate of this invention carries its characteristics through into such blended mixtures.

By 85% magnesia is meant compositions containing approximately 85% magnesia and the remainder fibrous material such as asbestos. The proportions may vary through a considerable range, for instance from 10% to 15% asbestos, but ordinarily the asbestos content is of the order of 13% to 15%.

Modulus of rupture as referred to above is in accordance with the conventional determination as applied to an 85% magnesia block. Normally such test is made upon a block 6" wide and 1½ to 2" thick and of sufficient length so that a break may be made halfway between 10" centers. Such piece of insulation is suspended between horizontal supports, placed parallel to each other at 10" intervals. A load is applied by means of a straight edge midway between the two supports. The load necessary to cause rupture of the insulating block is noted. The modulus of rupture is calculated from the following formula:

$$MR = \tfrac{3}{2} \times \frac{L \times l}{w \times t^2}$$

where $L$ = load in pounds required to cause rupture of test piece
$l$ = length in inches of the test piece between parallel supports
$w$ = width of test piece in inches
$t$ = thickness of test piece in inches

I claim:

1. A precipitated magnesium basic carbonate comprising a majority of particles of roughly spherical or oblate spheroid type ranging in average diameter by gradation from relatively few microns for the smaller particles to between 50 to 80 microns for the larger ones, said particles being composed of isotropic noncrystalline matrices containing minute crystals less than 20% of which are separately discernible at 100 magnifications.

2. A precipitated magnesium basic carbonate as set forth in claim 1 in which the minute crystalline structures of the particles are largely composed of doubly refracting crystals imparting a soft glow to the particles when these are viewed under crossed Nicol prisms at 100 magnifications.

3. A molded insulating structure comprising 90% to 85% of a magnesium basic carbonate as described in claim 1 and approximately 10% to 15% asbestos fiber and having a density of 9.5 to 10.5 pounds per cubic foot, a modulus of rupture of the order of 35, a linear shrinkage of less than 2%, and a volume shrinkage of less than 10%.

4. A molded insulating structure comprising 10% to 15% asbestos fiber and 90% to 85% magnesium basic carbonate of which approximately 60% is a precipitated magnesium basic carbonate as described in claim 1 and approximately 40% plastic of waste material from such carbonate, said structure having a density of about 14 pounds per cubic foot, a modulus of rupture of the order of 65, a linear shrinkage of approximately 3.25% and a volume shrinkage of approximately 13.5%.

LEWIS B. MILLER.